United States Patent
Yang et al.

(10) Patent No.: US 11,060,009 B2
(45) Date of Patent: *Jul. 13, 2021

(54) FILTRATE REDUCER FOR TEMPERATURE-RESISTANT CALCIUM-RESISTANT WATER-BASED DRILLING FLUID USED IN OIL AND GAS RESERVOIR PROTECTION, DRILLING FLUID, AND USES THEREOF

(71) Applicants: CNPC Engineering Technology R&D Company Limited, Beijing (CN); China University of Petroleum (East China), Qingdao (CN)

(72) Inventors: Yuping Yang, Beijing (CN); Jingping Liu, Qingdao (CN); Ying Wang, Beijing (CN); Long Li, Beijing (CN); Yan Zhang, Beijing (CN); Yushuang Liu, Beijing (CN); Pingliang Fang, Beijing (CN); Weiwei Hao, Beijing (CN); Wei Zhang, Beijing (CN)

(73) Assignees: CNPC ENGINEERING TECHNOLOGY R&D COMPANY LIMITED, Beijing (CN); CHINA UNIVERSITY OF PETROLEUM (EAST CHINA), Qingdao (CN)

(*) Notice: Subject to any disclaimer, the term of this patent is extended or adjusted under 35 U.S.C. 154(b) by 104 days.

This patent is subject to a terminal disclaimer.

(21) Appl. No.: 16/196,456

(22) Filed: Nov. 20, 2018

(65) Prior Publication Data

US 2020/0115612 A1  Apr. 16, 2020

(30) Foreign Application Priority Data

Oct. 15, 2018 (CN) .......................... 201811196150.9

(51) Int. Cl.
| | |
|---|---|
| *C09K 8/24* | (2006.01) |
| *C08F 220/58* | (2006.01) |
| *E21B 21/00* | (2006.01) |
| *E21B 21/06* | (2006.01) |

(52) U.S. Cl.
CPC ............. *C09K 8/24* (2013.01); *C08F 220/58* (2013.01); *E21B 21/003* (2013.01); *E21B 21/062* (2013.01); *C08F 220/585* (2020.02); *C08F 2800/20* (2013.01)

(58) Field of Classification Search
CPC .. C09K 8/24; C09K 8/035; C09K 8/26; C08F 220/58; C08F 220/585; C08F 2800/20; C08F 257/02; C08F 112/08; C08F 212/08; C08F 222/32; C08F 222/321; C08F 222/323; C08F 222/324; C08F 222/325; C08F 222/326; C08F 222/327; C08F 297/026; C08F 20/06; C08F 120/06; C08F 2220/06; C08F 222/322; C08F 222/328; C08F 20/18; C08F 120/18; C08F 220/18; C08F 299/024; C08F 299/0492; C08F 22/32; C08F 122/32; C09D 125/04; C09D 155/02; C09D 125/08; C09D 129/08; C09D 135/06; C09D 109/06; C09D 133/08; C09J 125/04; C09J 155/02; C09J 125/08; C09J 129/08; C09J 135/06; C09J 109/06; C09J 7/385; C09J 2433/00; C09J 133/08; C12Y 114/14011; C12Y 503/99007; C08J 2355/02; C08J 2455/02; C08J 2325/08; C08J 2425/08; C08J 2309/06; C08J 2409/06; C08J 2325/04; C08J 2425/04; C08J 2333/08; C08J 2433/08; C08L 55/02; C08L 25/08; C08L 29/08; C08L 35/06; C08L 9/06; C08L 25/04; C08L 2555/84; C08L 33/08; C10M 2205/04; C10M 107/12; C10M 143/10; C07C 253/28; C07C 4/24; C07C 15/46; C07C 69/653; C07C 57/04; C07C 57/54; C07C 69/54; C08G 18/638; C08G 18/672; C08G 18/6229; C08G 18/8116; C08G 18/8175; C08G 59/1466; C08G 18/6225; E21B 21/003; E21B 21/062; C12N 11/087

See application file for complete search history.

(56) References Cited

U.S. PATENT DOCUMENTS 9,353,305 B1 * 5/2016 Jiang ...................... C09K 8/035

FOREIGN PATENT DOCUMENTS

CN         104650823         5/2015

OTHER PUBLICATIONS

CN dictionary pages, and their translation: Number-average molecular weight (Mn) Dictionary of Chemistry and Chemical Technology (vols. I and II) Eds. Jianqui, C. and Man, X. Chemical Industry Press (2003): 2113.

* cited by examiner

*Primary Examiner* — Kumar R Bhushan
(74) *Attorney, Agent, or Firm* — Volpe Koenig

(57) ABSTRACT

A filtrate reducer for temperature-resistant calcium-resistant water-based drilling fluid used in oil and gas reservoir protection, a drilling fluid, and uses of the filtrate reducer and the drilling fluid are described. The filtrate reducer contains structural units represented by formulas (1), (2), and (3) herein. The water-based drilling fluid contains the filtrate reducer, and exhibits good inhibitive, rheological, filtrate reducing, and reservoir protection performance when it is applied in the drilling process in a high-temperature high-calcium deep salt-gypsum formation.

8 Claims, No Drawings

FILTRATE REDUCER FOR TEMPERATURE-RESISTANT CALCIUM-RESISTANT WATER-BASED DRILLING FLUID USED IN OIL AND GAS RESERVOIR PROTECTION, DRILLING FLUID, AND USES THEREOF

CROSS REFERENCE TO RELATED APPLICATIONS

This application claims priority to Chinese Application No. 201811196150.9, filed on Oct. 15, 2018, which is incorporated herein by reference as if fully set forth.

FIELD

The present invention relates to the technical field of petroleum and natural gas well drilling, and particularly relates to a filtrate reducer for temperature-resistant calcium-resistant water-based drilling fluid used in oil and gas reservoir protection, a drilling fluid, and uses of the filtrate reducer and the drilling fluid.

BACKGROUND

As strategic resources, petroleum and natural gas have significant influences on economic security and stable development of a country. As the demand for petroleum and natural gas is increased rapidly and the shallow oil and gas resources are depleted increasingly, the dependence of economic and industrial growth in China on foreign trade of petroleum is increased continuously. Facing the serious situation of energy resources, there is an urgent need for new superseding oil and gas resources. In China, according to the results of the second national oil and gas resource evaluation, the total quantity of oil resources is 94 billion tons, the total quality of conventional gas resources is 38 trillion cubic meters, and the remaining oil and gas resources are mainly distributed in deep strata. Most deep reservoirs in China are deeper than 5,000 m, the depth of the present deepest reservoir is close to 9,000 m, the downhole temperature is 180-260□, and massive salt-gypsum formations exist in most regions. At present, ultra-deep well drilling is carried out in Daqing, South China Sea, Jilin, Xinjiang, Tarim, Dagang and other oilfields. Drilling fluids that are resistant to ultra-high temperature and high calcium ($CaCl_2 \geq 1\%$) are the key to successful drilling in deep salt-gypsum formations. However, the existing drilling fluids are difficult to meet the requirements for resistance to ultra-high temperature and protection of reservoir under the condition of massive salt-gypsum formations. A series of severe technical difficulties incurred by the high temperatures failure of drilling fluid, such as well wall collapsing, jamming of drilling tools, well blowout, and reservoir contamination, etc., are encountered in drilling engineering. In deep well drilling, the high temperatures failure of drilling fluid may result in difficulties in cuttings carrying, suspension of weighting materials, and effective support of the well wall, and may cause severe safety accidents such as well caving, jamming of drilling tools, well blowout, etc., even lead to abandonment of the well. At present, in the use of water-based drilling fluids in drilling of ultra-high temperature wells that involve salt-gypsum formations, the performance of the drilling fluids is mainly maintained by increasing the dosage of treating chemicals. Such an approach not only involves high cost, heavy consumption of treating chemicals and frequent treatment, but also results in complex drilling accidents, severe reservoir contamination, low drilling rate, long drilling cycle, high production safety and public safety risks, and has severe impacts on drilling quality, drilling rate and benefits, and even affects the attainment of geological objectives.

Therefore, it is of great practical significance to make research on filtrate reducers for temperature-resistant calcium-resistant water-based drilling fluid used in oil and gas reservoir protection and drilling fluids that have such properties.

SUMMARY

To overcome the drawback that existing filtrate reducers for water-based drilling fluids are inapplicable to drilling processes in high-temperature high-calcium deep salt-gypsum formations, the object of the present invention is to provide a filtrate reducer for temperature-resistant calcium-resistant water-based drilling fluid used in oil and gas reservoir protection, a drilling fluid, and uses of the filtrate reducer and the drilling fluid.

The present invention provides a copolymer filtrate reducer, which contains structural units represented by formula (1), structural units represented by formula (2), and structural units represented by formula (3), wherein the mass ratio of the structural units represented by formula (1) to the structural units represented by formula (2) to the structural units represented by formula (3) is (0.1-0.2):1:(0.05-0.1), and the number-average molecular weight of the copolymer is 10,000-100,000 g/mol;

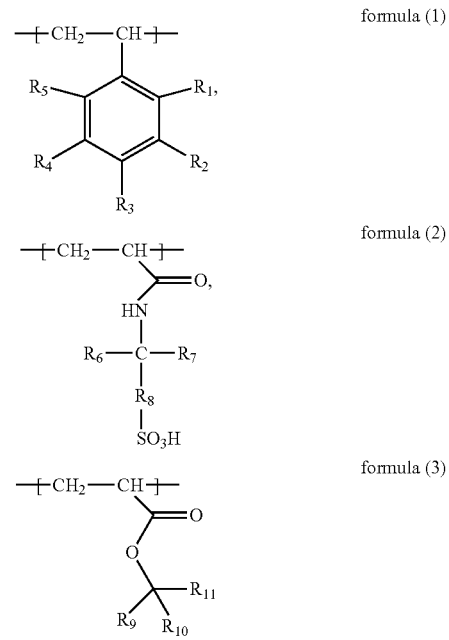

where, $R_1$, $R_2$, $R_3$, $R_4$, $R_5$, $R_6$, $R_7$, $R_9$, $R_{10}$, and $R_{11}$ are each independently H, $C_1$-$C_4$ alkyl, or $C_1$-$C_4$ alkoxy, and $R_8$ is selected from $C_1$-$C_4$ alkylene.

The present invention further provides a method for preparing a copolymer, which comprises: controlling a monomer M1 represented by formula (4), a monomer M2 represented by formula (5), and a monomer M3 represented by formula (6) to have a polymerization reaction in water that serves as a solvent in the presence of sodium dodecyl sulfate and 2,2'-azobis(2-methylpropionamidine) dihydrochloride, wherein the dosed mass ratio of the monomer M1 to the monomer M2 to the monomer M3 is (0.1-0.2):1:(0.05-0.1), and the polymerization reaction is performed under operating conditions that ensure the number-average molecular weight of the prepared copolymer is 10,000-100,000 g/mol;

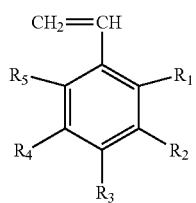

formula (4)

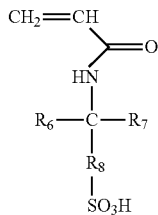

formula (5)

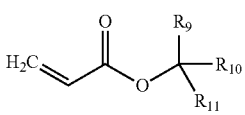

formula (6)

where, $R_1$, $R_2$, $R_3$, $R_4$, $R_5$, $R_6$, $R_7$, $R_9$, $R_{10}$, and $R_{11}$ are each independently H, $C_1$-$C_4$ alkyl, or $C_1$-$C_4$ alkoxy, preferably are each independently H, methyl, ethyl, methoxy, or ethoxy; $R_8$ is selected from $C_1$-$C_4$ alkylene, preferably is methylene or ethylidene.

The present invention further provides a copolymer prepared by the method described above.

The present invention further provides a use of the above-mentioned copolymer as a filtrate reducer for water-based drilling fluid.

The present invention further provides a water-based drilling fluid, which contains the copolymer described in the present invention as a filtrate reducer for water-based drilling fluid.

The present invention further provides a use of the water-based drilling fluid described in the present invention in a high-temperature high-calcium oil and gas reservoir drilling and reservoir protection.

Since the water-based drilling fluid according to the present invention contains the copolymer described in the present invention as a filtrate reducer, the water-based drilling fluid exhibits good inhibitive, rheological, filtrate reducing, and reservoir protection performance when it is applied in a drilling process for high-temperature high-calcium deep salt-gypsum formation. The reasons may be: the main chain of the copolymer consists of C—C bonds and the side chains contain structures with strong oxidation resistance, such as C—S and C—N, etc. A polymer with a main chain consisting of C—C bonds is obtained through copolymerization of monomers with C═C unsaturated double bonds, and the polymer is not easy to degrade at high temperatures owing to the high average bond energy of C—C single bonds (347.3 kJ·mol$^{-1}$); sulfonic groups (—$SO_3H$) introduced into the copolymer can thicken the hydrated films on clay particle surfaces, effectively maintain adsorption sites at high temperatures, and improve the thermal stability of the drilling fluid; in addition, since the sulfonic groups do not react with $Ca^{2+}$ to generate precipitate and thus attain a salt-resistant and calcium-resistant effect; moreover, the sulfonic groups can increase zeta potential by increasing the density of negative charges on clay particle surfaces, and thereby increase the electrostatic repulsion among the clay particles and improve the electrostatic stability of the drilling fluid at high temperatures; the benzene ring and similar groups introduced into the copolymer can inhibit the hydrolysis of the molecular chain to a certain degree, and thereby improve the thermal stability and salt resistance of the additives. The copolymer contains a large quantity of hydrophobic groups, which associate with each other into a dynamic physical grid structure under high-temperature and high-calcium conditions, so that there are many physical dynamic cross-linked points in the macromolecular groups, which protect the fine particles in the system and limit the flow of free water in the cross-linked network structure, thereby improve the temperature-resistant and calcium-resistant performance of the water-based drilling fluid, and reduce the filtrate loss of the drilling fluid system. The dynamic physical grid structure can also adhere to the surfaces of mud cakes via the hydrophilic sulfonate groups and amide groups, making the mud cakes densified and further reducing the filtrate loss of the drilling fluid. In addition, the hydrophilic sulfonate groups in the copolymer can adhere to the surface of reservoir rock, while the hydrophobic groups protrude outwards away from the rock surface, endowing the rock surface with a hydrophobic film, which can inhibit infiltration of free water in the drilling fluid into the reservoir, and thereby protects the reservoir from the damages of the drilling fluid.

DETAILED DESCRIPTION OF THE EMBODIMENTS

Hereunder some embodiments of the present invention will be detailed. It should be appreciated that the embodiments described here are only provided to describe and explain the present invention, but shall not be deemed as constituting any limitation to the present invention.

The ends points and any value in the ranges disclosed in the present invention are not limited to the exact ranges or values; instead, those ranges or values shall be comprehended as encompassing values that are close to those ranges or values. For numeric ranges, the end points of the ranges, the end points of the ranges and the discrete point values, and the discrete point values may be combined with each other to obtain one or more new numeric ranges, which shall be deemed as having been disclosed specifically in this document.

The present invention provides a copolymer applicable to filtrate reduction, which contains structural units represented by formula (1), structural units represented by formula (2), and structural units represented by formula (3),

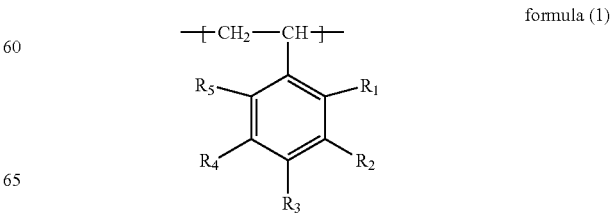

formula (1)

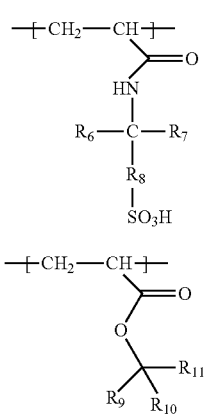

formula (2)

formula (3)

where, $R_1$, $R_2$, $R_3$, $R_4$, $R_5$, $R_6$, $R_7$, $R_9$, $R_{10}$, and $R_{11}$ are each independently H, $C_1$-$C_4$ alkyl, or $C_1$-$C_4$ alkoxy, and $R_8$ is selected from $C_1$-$C_4$ alkylene.

Preferably, $R_1$, $R_2$, $R_3$, $R_4$, $R_5$, $R_6$, $R_7$, $R_9$, $R_{10}$, and $R_{11}$ are each independently H, methyl, ethyl, methoxy, or ethyoxy; $R_8$ is selected from methylene or ethylidene.

More preferably, $R_1$, $R_2$, $R_3$, $R_4$, and $R_5$ are each independently H, methyl, or ethyl; $R_6$, $R_7$, $R_9$, $R_{10}$, and $R_{11}$ are methyl; $R_8$ is methylene.

In the copolymer described in the present invention, the mass ratio of the structural units represented by formula (1) to the structural units represented by formula (2) to the structural units represented by formula (3) is (0.1-0.2):1:(0.05-0.1), preferably is (0.1-0.15):1:(0.05-0.075), more preferably is (0.12-0.15):1:(0.055-0.07).

In the copolymer described in the present invention, the number-average molecular weight of the copolymer is 10,000-100,000 g/mol, preferably is 30,000-50,000 g/mol. In the present invention, the "number-average molecular weight" is measured by means of gel permeation chromatography (GPC), and the laboratory instrument used is a GPC Model E2695 from Waters Corporation, USA.

The present invention further provides a method for preparing a copolymer, which comprises: controlling a monomer M1 represented by formula (4), a monomer M2 represented by formula (5), and a monomer M3 represented by formula (6) to have a polymerization reaction in water that serves as a solvent in the presence of sodium dodecyl sulfate and 2,2'-azobis(2-methylpropionamidine) dihydrochloride,

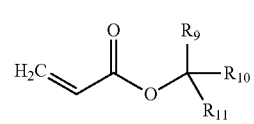

formula (4)

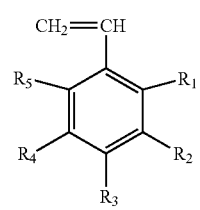

formula (5)

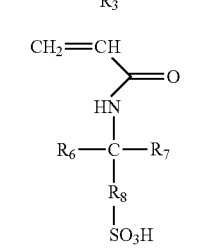

formula (6)

where, $R_1$, $R_2$, $R_3$, $R_4$, $R_5$, $R_6$, $R_7$, $R_9$, $R_{10}$, and $R_{11}$ are each independently H, $C_1$-$C_4$ alkyl, or $C_1$-$C_4$ alkoxy, preferably are each independently H, methyl, ethyl, methoxy, or ethoxy; $R_8$ is selected from $C_1$-$C_4$ alkylene, preferably is methylene or ethylidene.

Further preferably, $R_1$, $R_2$, $R_3$, $R_4$, and $R_5$ are each independently H, methyl, or ethyl; $R_6$, $R_7$, $R_9$, $R_{10}$, and $R_{11}$ are methyl; $R_8$ is methylene.

In the method described in the present invention, the dosed mass ratio of the monomer M1 to the monomer M2 to the monomer M3 is (0.1-0.2):1:(0.05-0.1), preferably is (0.1-0.15):1:(0.05-0.075), more preferably is (0.12-0.15):1:(0.055-0.07).

In the method described in the present invention, the dosed mass ratio of the monomer M2 to the sodium dodecyl sulfate to the 2,2'-azobis(2-methylpropionamidine) dihydrochloride may be (100-200):(0.3-0.6):(0.2-0.6), preferably is (100-200):(0.3-0.5):(0.2-0.4).

In the method described in the present invention, the polymerization reaction is performed under operating conditions that ensure the number-average molecular weight of the prepared copolymer is 10,000-100,000 g/mol, preferably is 30,000-50,000 g/mol.

Preferably, the operating conditions of the polymerization reaction include: temperature: 40-120° C., more preferably 60-100° C., optimally 80° C.; time: 1-10 h, more preferably 3-7 h, optimally 5 h.

According to a preferred embodiment of the present invention, the polymerization reaction process comprises the following steps:
(1) dissolving the sodium dodecyl sulfate in water to obtain a first aqueous solution;
(2) dissolving the monomer M1, the monomer M2, and the monomer M3 in water to obtain a second aqueous solution;
(3) dissolving the 2,2'-azobis(2-methylpropionamidine) dihydrochloride in water to obtain a third aqueous solution;
(4) controlling the first aqueous solution and the second aqueous solution to mix with each other at 40-120° C. temperature under nitrogen shielding to obtain a mixed solution, and then adding dropwise the third aqueous solution into the mixed solution, reacting for 1-10 h.

In the step (1), the dissolution process of the sodium dodecyl sulfate preferably is performed in a water bath at 40-120° C. temperature, optimally at 80° C. temperature.

In the step (1) to step (3), the water used for dissolution may be deionized water or distilled water respectively, preferably is distilled water.

The operating process in the step (4) may comprise: adding the first water solution into a reaction vessel while stirring (e.g., magnetic stirring), then adding the second water solution and stirring for 10-60 min under nitrogen shielding, and then adding dropwise the third water solution for reaction. The reaction vessel may be a conventional reaction vessel in the art, such as a three-neck flask.

In the present invention, the nitrogen shielding is implemented as follows: charging nitrogen for shielding at a rate that ensures about two bubbles float up per second.

The present invention further provides a copolymer prepared by the method described above.

The present invention further provides a use of the above-mentioned copolymer as a filtrate reducer for water-based drilling fluid.

The present invention further provides a water-based drilling fluid, which contains the copolymer described in the present invention as a filtrate reducer for water-based drilling fluid.

In the water-based drilling fluid, the copolymer described above is applied as a filtrate reducer in the water-based drilling fluid, so that the water-based drilling fluid still can maintain low filtrate loss in high-temperature and high-calcium environments, and is especially applicable to exploitation of deep or extra-deep oil and gas resources with a high-temperature high-calcium downhole environment. There is no particular restriction on the content of the copolymer in the present invention, which is to say, a conventional dose of filtrate reducer for water-based drilling fluid may be used; of course, the content may be adjusted appropriately according to the conditions of different wells; preferably, the content of the copolymer is 0.5-5 wt %, more preferably is 2-4 wt %, based on the total weight of the water-based drilling fluid.

The water-based drilling fluid may further contain other additives commonly used in water-based drilling fluids, besides water and the above-mentioned copolymer; preferably, the water-based drilling fluid contains bentonite, amine inhibitor, sulfomethylated phenolic resin, polyethylene glycol, graphite, polyanionic cellulose, potassium chloride, and sodium carbonate.

The bentonite refers to a clay with montmorillonite as the main mineral component, which can render viscous shearing strength, filter loss wall building property to the drilling fluid; for example, the bentonite may be sodium bentonite and/or calcium bentonite, preferably is sodium bentonite. More preferably, the content of the bentonite is 1-4 wt %, and even more preferably is 2-3 wt %.

The content of the amine inhibitor may be 1-3 wt %; the content of the sulfomethylated phenolic resin may be 2-4 wt %; the content of the polyethylene glycol may be 2-7 wt %; the content of the graphite may be 1-5 wt %; the content of the polyanionic cellulose may be 0.5-3 wt %; the content of the potassium chloride may be 0.5-3 wt %; the content of the sodium carbonate may be 0.1-0.5 wt %.

The above additives may be commercially available products, or may be prepared by conventional methods in the art. They will not be further detailed hereunder.

The present invention further provides a use of the above-mentioned water-based drilling fluid in high-temperature high-calcium oil and gas reservoir drilling and reservoir protection. The permeability in the high-temperature high-calcium oil and gas reservoir is 100-900 millidarcy. Hereunder the present invention will be detailed in some examples, but it should be noted that the present invention is not limited to those examples.

Example 1

The temperature of water bath is adjusted to 80° C., sodium dodecyl sulfate is dissolved in distilled water, and then the solution is poured into a three-neck flask and stirred by magnetic stirring at an appropriate stirring rate for 15 min.; 100 g distilled water is added into a 100 ml beaker, a monomer M1 represented by formula (4-1), a monomer M2 represented by formula (5-1), and a monomer M3 represented by formula (6-1) are added into the beaker respectively. After these substances are dissolved fully, the solution is poured into a three-neck flask, and is stirred for 30 min. under nitrogen shielding; 2,2'-azobis(2-methylpropionamidine) dihydrochloride is dissolved in distilled water, and then the resultant solution is added dropwise into the three-neck flask, wherein the mass ratio of the monomer M1 to the monomer M2 to the monomer M3 is 0.15:1:0.075, and the mass ratio of the monomer M2 to the sodium dodecyl sulfate to the 2,2'-azo-bis(2-methylpropionamidine) dihydrochloride is 200:0.5:0.4. A copolymer A1 is obtained after reaction for 5 h; the number-average molecular weight of the copolymer is 42,000.

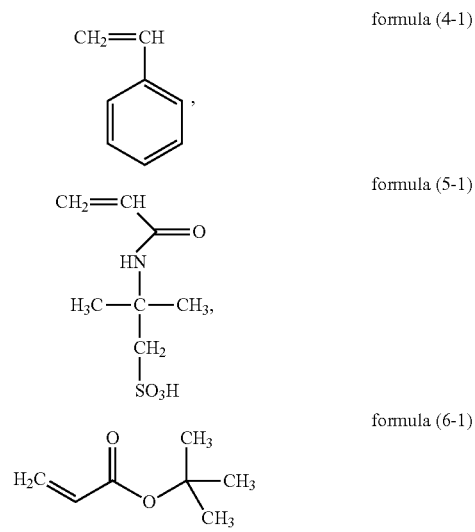

Example 2

The temperature of water bath is adjusted to 80□, sodium dodecyl sulfate is dissolved in distilled water, and then the solution is poured into a three-neck flask and stirred by magnetic stirring at an appropriate stirring rate for 15 min.; 100 g distilled water is added into a 100 ml beaker, a monomer M1 represented by formula (4-2), a monomer M2 represented by formula (5-1), and a monomer M3 represented by formula (6-1) are added into the beaker respectively. After these substances are dissolved fully, the solution is poured into a three-neck flask, and is stirred for 30 min. under nitrogen shielding; 2,2'-azobis(2-methylpropionamidine) dihydrochloride is dissolved in distilled water, and then the resultant solution is added dropwise into the three-neck flask, wherein the mass ratio of the monomer M1 to the monomer M2 to the monomer M3 is 0.1:1:0.05, and the mass ratio of the monomer M2 to the sodium dodecyl sulfate to the 2,2'-azobis(2-methylpropionamidine) dihydrochloride is 100:0.3:0.2. A copolymer A2 is obtained after reaction for 5 h; the number-average molecular weight of the copolymer is 20,000.

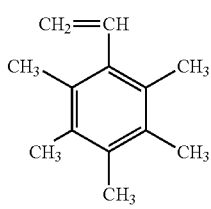

formula (4-2)

Example 3

The temperature of water bath is adjusted to 80° C., sodium dodecyl sulfate is dissolved in distilled water, and then the solution is poured into a three-neck flask and stirred by magnetic stirring at an appropriate stirring rate for 15 min.; 100 g distilled water is added into a 100 ml beaker, a monomer M1 represented by formula (4-3), a monomer M2 represented by formula (5-1), and a monomer M3 represented by formula (6-1) are added into the beaker respectively. After these substances are dissolved fully, the solution is poured into a three-neck flask, and is stirred for 30 min. under nitrogen shielding; 2,2'-azobis(2-methylpropionamidine) dihydrochloride is dissolved in distilled water, and then the resultant solution is added dropwise into the three-neck flask, wherein the mass ratio of the monomer M1 to the monomer M2 to the monomer M3 is 0.2:1:0.1, and the mass ratio of the monomer M2 to the sodium dodecyl sulfate to the 2,2'-azobis(2-methylpropionamidine) dihydrochloride is 100:0.6:0.6. A copolymer A3 is obtained after reaction for 5 h; the number-average molecular weight of the copolymer is 15,000.

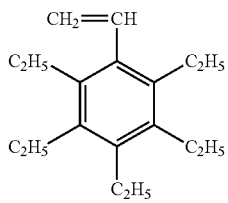

formula (4-3)

Comparative Example 1

A copolymer is prepared according to the method described in Example 1, but the monomer M1 is not added; thus, a copolymer D1 is obtained.

Comparative Example 2

A copolymer is prepared according to the method described in Example 1, but the monomer M2 is not added; thus, a copolymer D2 is obtained.

Comparative Example 3

A copolymer is prepared according to the method described in Example 1, but the monomer M3 is not added; thus, a copolymer D3 is obtained.

Applied Example 1

A water-based drilling fluid F1 is prepared according to the following formulation: 3% copolymer A1, 2% sodium bentonite, 2% amine inhibitor (from Chengdu Chunfeng Petroleum Technology Co., Ltd.), 3% sulfomethylated phenolic resin (from Chengdu Chunfeng Petroleum Technology Co., Ltd.), 4% polyethylene glycol-4000, 3% graphite (from Chengdu Chunfeng Petroleum Technology Co., Ltd.), 1% PAC-LV (polyanionic cellulose from Shandong Yangu Jiangbei Chemical Industry Co., Ltd.), 1% KCl, 0.3% $Na_2CO_3$, and water that accounts for the remaining content. The above-mentioned percentages in the drilling fluid are mass-volume ratios; for example, 3% copolymer A1 refers to that 3 g copolymer A1 is added in 100 ml water-based drilling fluid.

Applied Examples 2-3 and Comparative Applied Examples 1-3

Water-based drilling fluids are prepared according to the method described in Applied Example 1, but the copolymer A1 is replaced with the copolymers A2-A3 and D1-D3 respectively; thus, water-based drilling fluids F2, F3, DF1, DF2, and DF3 are obtained respectively.

Comparative Applied Example 4

A water-based drilling fluid DF4 is prepared according to the following formulation: 2% sodium bentonite, 2% amine inhibitor, 3% sulfomethylated phenolic resin, 4% polyethylene glycol-4000, 3% graphite, 1% PAC-LV, 1% KCl, 0.3% $Na_2O_3$, and water that accounts for the remaining content.

Comparative Applied Example 5

A water-based drilling fluid DF5 is prepared according to the following formulation: 3% sulfonated resin, 2% sodium bentonite, 2% amine inhibitor, 3% sulfomethylated phenolic resin, 4% polyethylene glycol-4000, 3% graphite, 1% PAC-LV, 1% KCl, 0.3% $Na_2O_3$, and water that accounts for the remaining content.

Test Case 1

The above-mentioned water-based drilling fluids F1-F3 and DF1-DF5 are sampled in 400 mL volume respectively, 1.0 wt % $CaCl_2$ is added into each of the water-based drilling fluids; each drilling fluid is stirred for 20 min. at 5,000 rpm stirring rate, and then is loaded into an aging can, the aging can is loaded into a roller hearth, and is rolled for 16 h at a constant temperature of 200° C.; then, the aging can is taken out from the roller hearth and cooled to room temperature; next, the drilling fluid is stirred for 20 min. at 5,000 rpm stirring rate again, and then the apparent viscosity (AV, mPa·s), plastic viscosity (PV, mPa·s), yield point (YP, Pa), 10 s and 10 min. gel strengths, and API filtrate loss at medium pressure ($FL_{API}$, mL), and filtrate loss at high temperature and high pressure ($FL_{HTHP}$, mL, @200° C.) of each drilling fluid are measured respectively as per GB/T16783.1-2006. The results are shown in Table 1.

TABLE 1

| Water-based drilling fluid | Test Condition | AV mPa·s | PV mPa·s | YP Pa | $FL_{API}$ mL | $FL_{HTHP}$ mL |
|---|---|---|---|---|---|---|
| F1 | Before aging | 46 | 29 | 17 | 2.6 | — |
|  | After aging | 40 | 27 | 13 | 3.0 | 20.4 |
| F2 | Before aging | 45 | 28 | 17 | 2.8 | — |
|  | After aging | 39 | 25 | 14 | 3.0 | 21.0 |
| F3 | Before aging | 43 | 27 | 16 | 3.4 | — |
|  | After aging | 33 | 22 | 11 | 4.2 | 25.8 |

TABLE 1-continued

| Water-based drilling fluid | Test Condition | AV mPa·s | PV mPa·s | YP Pa | FL$_{API}$ mL | FL$_{HTHP}$ mL |
|---|---|---|---|---|---|---|
| DF1 | Before aging | 44 | 28 | 16 | 4.2 | — |
| | After aging | 38 | 25 | 13 | 5.4 | 44.2 |
| DF2 | Before aging | 40 | 27 | 13 | 4.6 | — |
| | After aging | 34 | 25 | 9 | 6.4 | 45.0 |
| DF3 | Before aging | 45 | 29 | 16 | 4.2 | — |
| | After aging | 39 | 27 | 12 | 5.2 | 42.6 |
| DF4 | Before aging | 40 | 22 | 18 | 6.4 | — |
| | After aging | 17 | 10 | 7 | 8.8 | 48.4 |
| DF5 | Before aging | 45 | 32 | 13 | 3.2 | — |
| | After aging | 38 | 24 | 14 | 4.0 | 33.2 |

It is seen from Table 1: the water-based drilling fluid provided in the present invention still has relatively low API filtrate loss and HTHP filtrate loss under the condition of 1.0 wt % CaCl$_2$, it indicates that the water-based drilling fluid provided in the present invention meets the requirement for high temperature resistance (at 200° C.) under the condition of 1.0 wt % CaCl$_2$.

Test Case 2

The reservoir protection performance of the drilling fluids F1-F3 and DF1-DF4 are tested as per SYT6540-2002 "Lab Testing Method of Drilling and Completion Fluids Damaging Oil Formation" on a JHMD-1 HTHP dynamic filter tester respectively. The results are shown in Table 2, wherein the original permeability values of the well cores used in the test refer to the initial values in Table 2.

TABLE 2

| Drilling Fluid | Well Core No. | Oleic Permeability/10$^{-3}$ μm$^2$ | | | Permeability Recovery Rate/% | |
|---|---|---|---|---|---|---|
| | | Initial Value | After Plugging | Plugging Ratio/% | After Damage | After End Face Cutting |
| F1 | 1 | 214.2 | 5.6 | 97.4 | 92.5 | 95.6 |
| F2 | 2 | 231.5 | 8.1 | 96.5 | 92.3 | 95.4 |
| F3 | 3 | 226.4 | 10.6 | 95.3 | 90.6 | 94.8 |
| DF1 | 4 | 242.3 | 21.1 | 91.3 | 81.3 | 88.4 |
| DF2 | 5 | 231.4 | 13.4 | 94.2 | 82.5 | 87.6 |
| DF3 | 6 | 226.5 | 17 | 92.5 | 83.1 | 89.3 |
| DF4 | 7 | 234.0 | 33.7 | 85.6 | 80.7 | 89.4 |
| DF5 | 8 | 241.3 | 14 | 94.2 | 76.3 | 83.6 |

It is seen from the data in Table 2: after the filtrate reducer for temperature-resistant calcium-resistant water-based drilling fluid used in oil and gas reservoir protection provided in the present invention is added into the drilling fluid, the drilling fluid attains a much better reservoir plugging effect and obtains higher permeability recovery capability, wherein the plugging ratio may be 95% or above, preferably 96% or above, apparently higher than the plugging ratio (85.6%) of the same drilling fluid without the filtrate reducer for water-based drilling fluid provided in the present invention; in addition, the permeability recovery ratio may be 90% or above, preferably 92% or above, apparently higher than the permeability recovery ratio (80.7%) of the same water-based drilling fluid without the filtrate reducer for temperature-resistant calcium-resistant water-based drilling fluid used in oil and gas reservoir protection provided in the present invention.

While some preferred embodiments of the present invention are described above, the present invention is not limited to the details in those embodiments. Those skilled in the art can make various simple modifications and variations to the technical scheme of the present invention within the scope of the technical concept of the present invention. However, all those modifications and variations shall be deemed as falling into the scope of protection of the present invention.

In addition, it should be noted that the specific technical features described in above specific embodiments may be combined in any appropriate form, provided that there is no conflict among them. To avoid unnecessary repetition, various possible combinations are not described specifically in the present invention.

Moreover, different embodiments of the present invention may also be combined freely as required, as long as the combinations don't deviate from the ideal and spirit of the present invention. However, such combinations shall also be deemed as falling into the scope disclosed in the present invention.

The invention claimed is:

1. A copolymer containing structural units represented by formula (1), structural units represented by formula (2), and structural units represented by formula (3), wherein the mass ratio of the structural units represented by formula (1) to the structural units represented by formula (2) to the structural units represented by formula (3) is (0.1-0.2):1:(0.05-0.1), and the number-average molecular weight of the copolymer is 30,000-50,000 g/mol;

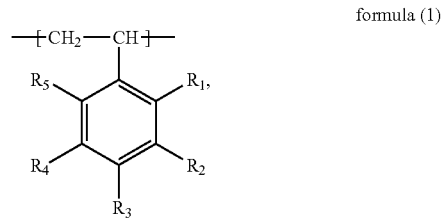

formula (1)

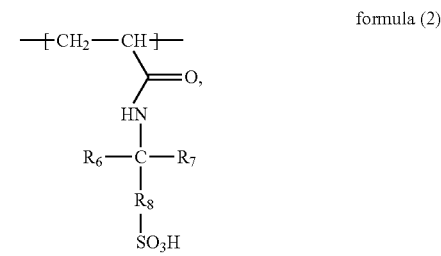

formula (2)

formula (3)

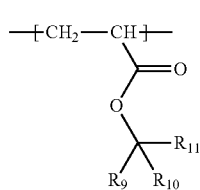

$R_1, R_2, R_3, R_4, R_5, R_6, R_7, R_9, R_{10}$, and $R_{11}$, are H, $C_1$-$C_4$ alkyl, or $C_1$-$C_4$ alkoxy respectively and independently, and $R_8$ is selected from $C_1$-$C_4$ alkylene.

2. The copolymer according to claim 1, wherein $R_1, R_2, R_3, R_4, R_5, R_6, R_7, R_9, R_{10}$, and $R_{11}$ are H, methyl, ethyl, methoxy, or ethyoxy respectively and independently; $R_8$ is selected from methylene or ethylidene.

3. A method of preparing a drilling fluid comprising adding the copolymer according to claim 1 to a water-based drilling fluid.

4. A water-based drilling fluid, containing a filtrate reducer for water-based drilling fluid, wherein the filtrate reducer is a copolymer containing structural units represented by formula (1), structural units represented by formula (2), and structural units represented by formula (3), wherein the mass ratio of the structural units represented by formula (1) to the structural units represented by formula (2) to the structural units represented by formula (3) is (0.1-0.2):1:(0.05-0.1), and the number-average molecular weight of the copolymer is 30,000-50,000 g/mol;

formula (1)

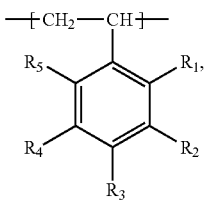

formula (2)

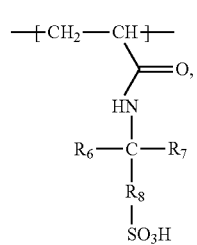

formula (3)

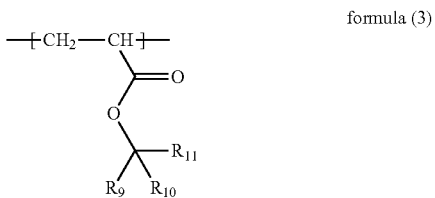

where, $R_1, R_2, R_3, R_4, R_5, R_6, R_7, R_9, R_{10}$, and $R_{11}$, are each independently H, $C_1$-$C_4$ alkyl, or $C_1$-$C_4$ alkoxy, and $R_8$ is selected from $C_1$-$C_4$ alkylene.

5. The water-based drilling fluid according to claim 4, wherein $R_1, R_2, R_3, R_4, R_5, R_6, R_7, R_9, R_{10}$, and $R_{11}$ are each independently H, methyl, ethyl, methoxy, or ethyoxy; $R_8$ is selected from methylene or ethylidene.

6. A method of high-temperature high-calcium oil and gas reservoir drilling and reservoir protection comprising drilling in the presence of the water-based drilling fluid according to claim 4.

7. The copolymer according to claim 1, wherein the mass ratio of the structural units represented by formula (1) to the structural units represented by formula (2) to the structural units represented by formula (3) is (0.1-0.15):1:(0.05-0.075).

8. The water-based drilling fluid according to claim 4, wherein the mass ratio of the structural units represented by formula (1) to the structural units represented by formula (2) to the structural units represented by formula (3) is (0.1-0.15):1:(0.05-0.075).

\* \* \* \* \*